July 13, 1943.   A. BOYNTON   2,323,893
STAGE LIFT FLOW DEVICE
Filed Dec. 8, 1939   4 Sheets-Sheet 1

ALEXANDER BOYNTON,
INVENTOR,
BY Jesse R. Stone
Leslie B. Clark
ATTORNEYS.

July 13, 1943.  A. BOYNTON  2,323,893
STAGE LIFT FLOW DEVICE
Filed Dec. 8, 1939  4 Sheets-Sheet 3

ALEXANDER BOYNTON, INVENTOR,
BY Jesse R. Stone
Lester D. Clark
ATTORNEYS.

Patented July 13, 1943

2,323,893

UNITED STATES PATENT OFFICE 2,323,893

STAGE LIFT FLOW DEVICE

Alexander Boynton, San Antonio, Tex.

Application December 8, 1939, Serial No. 308,315

4 Claims. (Cl. 137—111)

My invention relates to differential stage lift flow devices for expelling liquids from wells, especially oil wells.

The principal object is to provide a valve operating mechanism which will act as a brake or regulator for slowing the opening movement of the valve in combination with gas metering means.

Another object is to provide valve operating means which will employ a relatively great steady force in holding the valve seated and controlling its other movements.

A further object is to provide double metering chambers which will control both the high and low sides of the power graph.

In accomplishing these and other objects, I employ a piston of relatively large diameter to operate a spring loaded valve of relatively small diameter in combination with another piston and check valve operating in a chamber filled with viscous fluid which will resist quick movements of the valve in one direction only, as will be clearly understood from the following specification and the accompanying drawings in which—

Identical characters of reference are employed to designate similar parts throughout the several views.

The difference between the value of the pressure fluid and the force exerted by the well liquid and pressure fluid within the eduction tube will be referred to as the differential, this being the force which governs the opening and closing of the pressure fluid valve in each flow device.

The column of well liquid caused to upstand in the eduction tube responsive to the pressure fluid within the induction tube will be referred to as the upstanding column, whether the same be in the tubing for tubing flow or in the annular space between the tubing and the casing for casing flow.

It will be understood that expulsion of liquid from the well is accomplished by elongating the upstanding column through the medium of expanding gas caused to flow through the devices at relatively small differentials.

Three forces, two constant and one variable, are involved in the operation of this device. The constant forces are those of the pressure fluid and the spring. The variable force is exerted by the upstanding column according to distance above its base.

Figure 2:
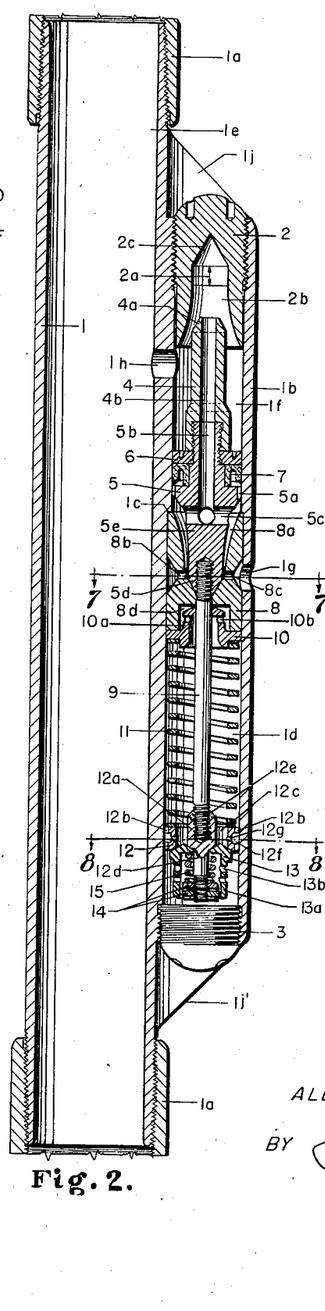
Fig. 2 is a longitudinal section through the preferred embodiment of the invention for tubing flow.

In Fig. 2, the tubular body 1, having threaded ends adapted to be screwed into the tubing couplings 1a, has a lateral shell 1b, parallel with the conduit 1e. This shell is hermetically closed at its ends by the plugs 2 and 3. The valve seat plug 2 has a valve seat 2c at the upper end of the trumpet-shaped metering chamber 2b adapted to be engaged by the valve 4a of the member 4, having a central passage 4b registering with the passage 5b of the member 5. Between the valve seat and the metering chamber, the untapered portion 2a has a sleeve valve fit over the upper portion of the valve member 4.

The piston base 5, having the lower extension 5e and the central passage 5b and the cross bores 5c communicating therewith, has threaded connection with the valve member 4 and with the rod 9. The cup retainer ring 6, having slight clearance over the upper portion of the member 5 and the lower end of the member 4, is locked by the lower end of the member 4 upon an external shoulder of the piston base 5 in proper position closely to confine the U cup or other packing 7 between it and the flanged central portion of the member 5. The U cup 7 is adapted to be expanded against the polished wall of the chamber 1f by fluid pressure entering from below it through the openings 5a. The flanged portion of the member 5, the ring 6, and U cup 7 are closely slidable within the polished chamber 1f.

The retainer valve seat member 8, having the internal chamber 8d, may be pressed into the shell of the chamber 1d and landed upon the slight internal shoulder 1c. The member 8 has a central opening of slightly larger diameter than the shaft 9 which passes centrally through it. The upper portion of this opening is formed into a valve seat adapted normally to engage the valve 5d.

The chamber 1d may be filled with a viscous liquid such as castor oil or ground lead and oil. This liquid will allow the valve 4a to seat quickly in response to the proper differential obtaining above and below the pressure fluid valve assembly, because due to the slight force required to compress the spring 15, the check valve 13 will open easily and allow the fluid from above the pressure fluid valve controlling assembly to flow freely through the openings 12c.

The breather chamber 8d provides a secondary reservoir for liquid similar to that within the chamber 1d. When the valve assemblies move upward, the rod 9 will be partially withdrawn and liquid within the chamber 8d thereby will be drawn into the chamber 1d through the openings 10b and the clearance between the rod 9 and the central opening through the member 10. When the valve assemblies again move downward, liquid within the chamber 1d will be displaced by the incoming upper portion of the rod 9 thereby partially refilling the chamber 8d. The clearance between the rod 9 and the central opening through the member 8, the lateral openings 10b, and the clearance between the rod 9 and member 10 provide that the chamber 8d can "breathe" responsive to the alternate outgoing and incoming of the rod 9. The upstanding projection 10a through which the rod 9 has slight clearance, serves as a means for trapping and holding sand particles and the like in the chamber 8d, thus restraining them from descending into the chamber 1d.

The normal engagement of the valve 5d upon its seat within the member 8 will confine the liquid within the chambers 1d and 8d while the device is not in operation.

The spring 11, and all similar springs in the other embodiments, may be fabricated of flat wire, as shown, in order to provide for maximum resistance by the viscous liquid between the coils.

The piston 12, having slight clearance within the chamber 1d, has the peripheral grooves 12b, a depending extension 12d, and an upstanding central boss 12a threadedly engaged over the rod 9 and secured to it by the weld 12e. This piston has also the openings 12c adapted to be closed by the annular valve 13 formed upon the upper extremity of the sleeve 13a having the lateral openings 13b. The nuts 14, having threaded engagement upon the lower end of the extension 12d, support the coiled spring 15, resiliently engaged under the valve 13, normally seated upon the piston 12. The sleeve 13 is freely slidable over the nuts 14, and the coiled spring 15 has slight clearance over the extension 12d.

The coiled spring 11, having slight clearance within the chamber 1d is installed under some compression between the piston 12 and the plate 10, the latter, preferably, being pressed into the shell 1f and landed upon the member 8. The plate 10 has a central circular opening at its upper end through which the rod 9 is slidable. The longitudinal peripheral grooves 12b, the annular recess 12f, and the lateral openings 12g of the member 12 are for the purpose of providing passage and of offering resistance to a fluid moving between the piston 12 and the wall of the chamber 1d when the valves move downward.

The check valve 13 is adapted to open on the upstroke of the valve member 4, thus allowing liquid confined within the chamber 1d to pass freely through the openings 12c; but on the down-stroke of the valve member 4, the openings 12c will be closed by the valve 13, thus forcing the liquid within the chamber 1d to take the more restricted path through the small longitudinal slots 12b, the annular recess 12f, and the lateral openings 12g of the piston 12 which has a close sliding fit within the chamber 1d. The lateral openings 13b allow for the free escape of liquid within the shell 13a as the valve 13 moves away from its seat.

The metering chamber 2b has its upper extremity proximate the straight bore 2a of slightly greater diameter than that of the valve member 4 which may be untapered. This trumpet-shaped chamber has increasingly greater clearance with the member 4 as the valve 4a moves away from the straight bore 2a, as is plainly shown in Fig. 2.

The engagement of the valve 5d upon its seat in the member 8 so limits the downward movement of the valve member 4 that the upper portion of this member can never become completely withdrawn from within the metering chamber 2b. Likewise, the engagement of the valve 4a upon its seat 2c so limits the upward movement of the member 5 that its lower portion 5e can never become completely withdrawn from the metering chamber 8a within the member 8.

When the valve 5d is seated as in Fig. 2, there is sufficient clearance between the lower portion 5e of the member 5 to cause sufficient flow of pressure fluid through this clearance to produce the necessary differential to initiate upward movement of the valves 4a and 5d. This clearance increases between the extension 5d and the member 8 as the valves move upward, thereby providing the necessary increased differential to overcome the increasing resistance of the spring 11. The action of the upper portion of the member 4 within the metering chamber 2b is the same as the operative relation between the extension 5e and the other metering chamber 8a, except that these chambers operate in reverse order, i. e., one acts to increase the flow of pressure fluid through the device, while the other acts to reduce such flow. The double opposed metering chambers 2b and 8a will be discussed further in connection with the power graph.

The path of the pressure fluid through the device is into the lateral opening 1g, through the recess 8c, the lateral openings 8b, the chamber 8a, the cross bores 5c, the aligned passages 5b and 4b, the clearance between the member 4 and the wall of the metering chamber 2b, and out into the tubing via the lateral opening 1h. This flow of pressure fluid will cause the valve 4a to engage the seat 2c at the predetermined differential force required to compress the spring 11.

The members 4, 5, 6, and 7 will be referred to as the pressure fluid valve assembly. The valve which opens to admit pressure fluid and closes to stop the flow thereof will be referred to as the pressure fluid valve. The members 9 to 15, both inclusive, will be referred to as the pressure fluid valve controlling assembly.

When, as frequently happens, during the flowing operation, gas breaks through a considerable portion of the upstanding liquid column in the eduction tube, slugs of this liquid will fall considerable distances. The impact of each falling slug will create a momentary false differential of relatively low value and cause all valves below the point of impact to fly open unless resistance to such flying open movement is provided to continue longer than the duration of such disturbance or false differential. The check valve 13 being closed during the downward movement of the pressure fluid valve assembly, sufficient of the liquid in the chamber 1d below the pressure fluid valve controlling assembly must pass through the small vertical slots 12b to allow the valve 4a to pass out of the untapered portion 2a before a new flow of pressure fluid can pass through the device into the upstanding column.

In this connection, it will be borne in mind that the untapered portion 2a has a close slide valve fit with the valve member 4 and that the valve 4a must pass out of the untapered portion 2a before any additional gas can pass through the device.

As stated, the duration of disturbances in the eduction tube, due to falling slugs of well liquid, are of slight duration and seldom last for more than one to three seconds. If, then, the small slots 12b delay the recession of the valve 4a in its movement within the untapered portion 2a longer than the slight duration of the false differentials within the eduction tube, it is evident that the admission of additional pressure fluid will not occur at such times when its admission is unnecessary and harmful.

Differential flow valves heretofore have been increasingly less efficient as the depth increased, due to the increasing number of falling slugs in deeper wells.

The retarded opening movement of the gas inlet valve 4a, as above explained, evens and makes uniform the differential force and renders the gas inlet valve of each device truly responsive to the average differential force obtaining at each level, instead of the devices being improperly actuated by temporary false differentials, as they would be without this governing means controlling the valve opening movements.

The intake and the discharge openings 1g and 1h and the aggregate size of the several openings 8b should be much larger than the opening 4b through the valve member. This is so because the differential which actuates the valve is created by the comparatively restricted opening through the movable assembly. This rule requiring relatively large intake and discharge openings also applied to the constructions illustrated in Figs. 3, 4, 10, and 11, but, to avoid greater length of discussion, will not be repeated in connection with those modifications.

Figure 3:
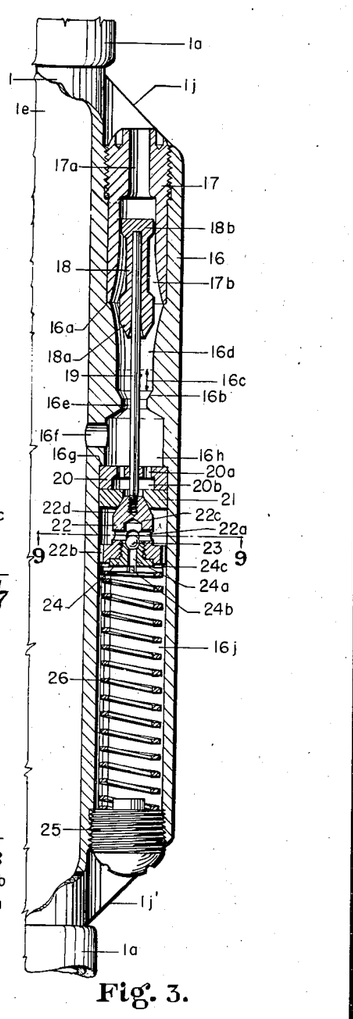
Fig. 3 is a longitudinal section through a modified form of the invention adapted for tubing flow.

In Fig. 3 there is illustrated a modified form of the invention in which the lateral shell 16, having a central bore of varying diameters, is threadedly engaged at its upper end by the intake bushing 17 and has its lower chamber 16j hermetically closed by the plug 25.

The member 17, having its lower end engaged upon the internal annular shoulder 16a, has a central opening 17a for the admission of pressure fluid and a downwardly flared metering chamber 17b within the upper portion of which chamber the head 18b of the plunger 18 normally has slight clearance. This plunger has the valve 18a formed upon its lower end and a central bore extending to within the head 18b adapted to receive the rod 19. The bore in the plunger is slightly tapered, the upper end being of slightly greater diameter than the rod and the lower end being of appreciably greater diameter than the rod. The plunger 18, therefore, may swing slightly upon the rod in order to find a central engagement exactly upon its seat 16b immediately above the opening 16e, which opening has relatively large clearance with the rod 19 in order to provide proper passage for pressure fluid.

The metering chamber 16d proximately below the similar chamber 17b is flared upwardly and has its lower extremity formed into an untapered portion 16c, having a slide valve fit with the lower enlarged end of the plunger 18.

The plate 20, having a central opening through which the rod 19 has slight clearance, may be pressed into the chamber 16j and landed upon the internal annular shoulder 16g. The plate 21, having a central opening through which the rod 19 has relatively large clearance, may be pressed likewise into the chamber 16j and landed upon the member 20.

The check valve housing 22, having threaded connection with the rod 19, has its upper end formed into a valve 22d adapted to engage a seat upon the nether side of the plate 21. The member 24, having central threaded engagement within the lower extremity of the check valve housing 22, has a central opening 24a over the upper end of which the check valve 23 is adapted to seat.

The cross bores 22a provide for free discharge of liquid through them and the opening 24a upon the downward stroke of the valves, the pocket 22c being to allow the check valve to pass upward out of registration with the cross bores 22a.

The coiled spring 26, having some clearance with the wall of the chamber 16j, is installed under some compression between the plug 25 and the member 24. This spring resiliently urges the valve 22d normally to engage its seat upon the member 21, and also normally supports the plunger 18 resiliently spaced away from its seat 16b, as appears in Fig. 3.

The path of the pressure fluid through the device illustrated in Fig. 3 is out of the annular space between the tubing and the casing via the intake opening 17a, the clearance between the plunger head 18b and the wall of the metering chamber 17b, the clearance between the enlargement above the valve 18a and the wall of the metering chamber 16d, the passage 16e, the chamber 16h, and the lateral opening 16f. This flow of pressure fluid will cause the valve 18a to engage the seat 16b at a predetermined differential force required to compress the spring 26.

The chambers 16j and 20b may be filled with a viscous liquid such as castor oil or ground lead and oil. This liquid is contained within these chambers while the device is in transit between the factory and the well by the normal engagement of the valve 22d with its seat upon the plate 21.

The valve 18a may close upon its seat 16b without appreciable resistance except the force required to compress the spring 26, because the check valve 23 will open as the assembly of valves moves downward. During this movement, the liquid within the chamber 16j may pass through the member 22 via the openings 24a and 22a and the small longitudinal peripheral slots 22b. After the valve 18a is seated, it will open slowly because on the upstroke of the pressure fluid valve controlling assembly the check valve 23 will be closed, as appears in Fig. 3. Then, the only path for the liquid within the chamber 16j will be through the small longitudinal slots 22b, the annular recess 24c, and the slots 24b. A small portion of the liquid within the chamber 16j will overflow into the auxiliary chamber 20b as the valve 18a moves downward. This overflow is caused by the displacement of the incoming portion of the rod 19. On the upstroke of the valve 18a, the liquid which was forced to overflow into the chamber 20b will be drawn back into the chamber 16j due to the withdrawal of a portion of the rod 19, as is apparent. The breather openings 20a and the slight clearance between the rod 19 and the central opening through the plate 21 provide for free passage through them in order that the valve movements will not be hindered by impingements upon liquid, except as provided for by the pressure valve controlling assembly.

After the valve 18a leaves the seat 16b, it will have to pass entirely out of the untapered portion 16c before the device will admit pressure fluid into the upstanding column of well liquid within the tubing. False low differentials within the tubing produced by falling slugs, therefore, will not instantly kick open the valve 18a, as was explained for the somewhat similar condition with reference to Fig. 2.

Figures 11, 12, 13, 14, 15:
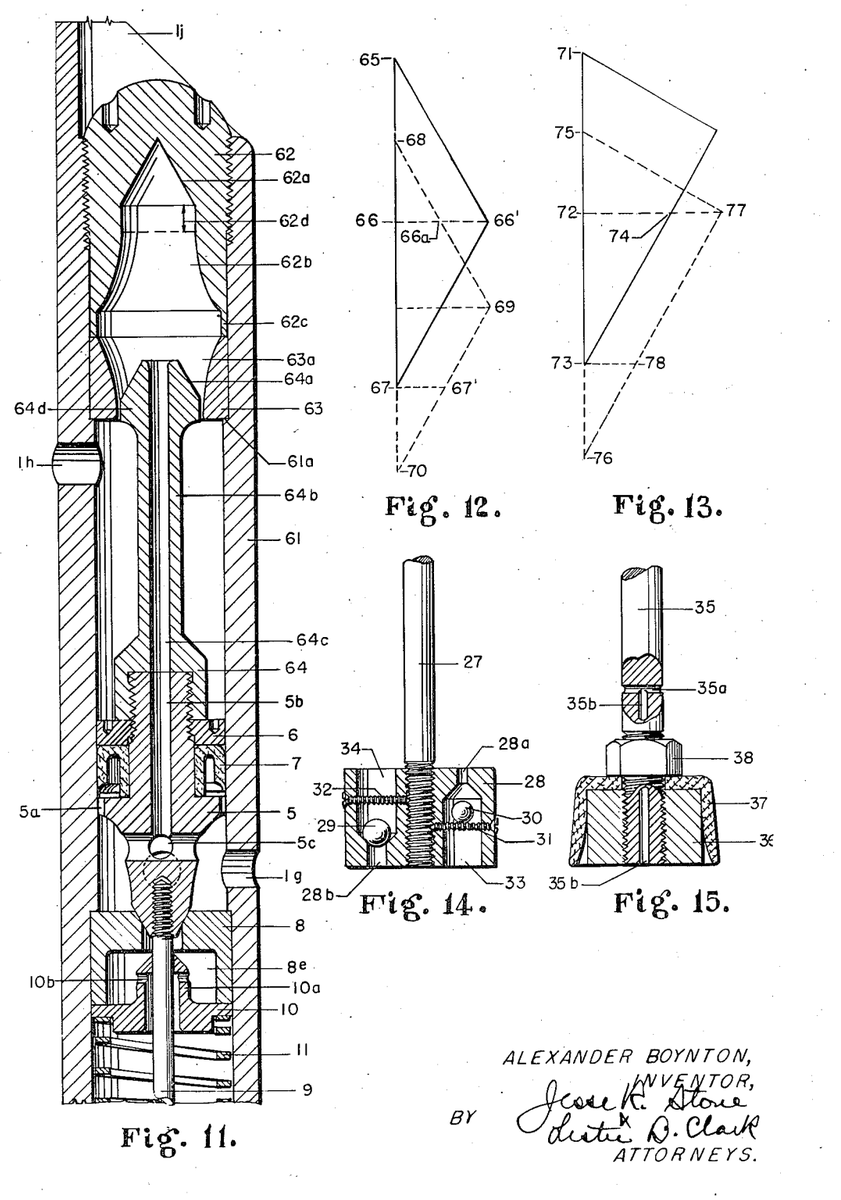
Fig. 11 is a longitudinal section through a modified form of valve and metering chamber.
Fig. 12 is a diagrammatic illustration of a power graph.
Fig. 13 is a diagrammatic illustration of another power graph.
Fig. 14 is a longitudinal section through a modified form of check valve assembly.
Fig. 15 is a longitudinal section through another modified form of check valve assembly.

Fig. 14 illustrates another modified form of check valve adapted for use in Figs. 2 and 3 and which may be employed to replace either of the check valve assemblies therein shown. The rod 27, corresponding to either the rod 9 of Fig. 2, or the rod 19 of Fig. 3, has threaded engagement within the central opening through the cage or check valve housing member 28. This housing or cage should have slight clearance within the chamber 1d, Fig. 2, or 16j, Fig. 3. The check valve 29 within the bore 34 is adapted to seat over the upper end of the bore 28b.

The check valve 30 within the bore 33 is adapted to seat under the lower end of the bore 28a. Each of the bores 33 and 34, which may be of the same size, has relatively large clearance with the contained check valve. The bore 28a may be such as one-fourth the diameter of the bore 33, while the bore 28b may be such as one-half the diameter of the bore 34. The check valves have relatively large clearance within their respective bores. The pins 31 and 32 crossing centrally of the bores 33 and 34, respectively, are for the obvious purpose of confining the check valves within their bores.

If the check valve shown in Fig. 14 be installed in Fig. 2, replacing the check valve therein shown, it will be inverted, the central threaded opening through the member 28 being provided for such reversal. So installed, the valve 4a in Fig. 2 would close quickly and open slowly, because in closing the larger of the two small bores 28b would be open and the smaller bore 28a would be closed, and vice versa.

If the check valve shown in Fig. 14 be installed upside up, in Fig. 3, replacing the one therein shown, the valve 18a will close quickly and open slowly because the valve 29 governing the larger outlet 28b will open on the down-stroke of the valve 18a, and the valve 30 governing the smaller opening 28a will close on the upstroke, and vice versa.

Fig. 15 illustrates a form of check valve assembly which may be installed in either Fig. 2 or Fig. 3, replacing either of the check valve assemblies therein shown. The rod 35 corresponds to the rod 9 in Fig. 2 and to the rod 19 in Fig. 3.

The cup 37, which may be of leather or other tough pliable substance, receives the rod 35 through a central opening and is confined between the support ring 36 and nut 38, each having threaded engagement over the rod 35. The central opening 35b and the cross bore 35a provide limited passage for the liquid within the chamber 1d or 16j according to whether the check valve assembly be installed in Fig. 2 or in Fig. 3. If this check valve assembly be installed in Fig. 2, the cup 37 will collapse and allow the valve 4a to seat quickly, but will expand against the wall of the bore 1d to resist quick opening of that valve. During the opening movement, the only path through the check valve for the viscous liquid is through the small openings 35b and 35a.

If the check valve assembly shown in Fig. 15 be installed in Fig. 3, to replace the check valve assembly therein shown, it will be reversed by turning over and screwing the rod 35 into the other end of the member 36. The cup 37 then will permit quick closing of the valve 18a and accomplish slow opening of that valve in an obvious manner.

Figures 4, 5, 6, 7, 8, 9:
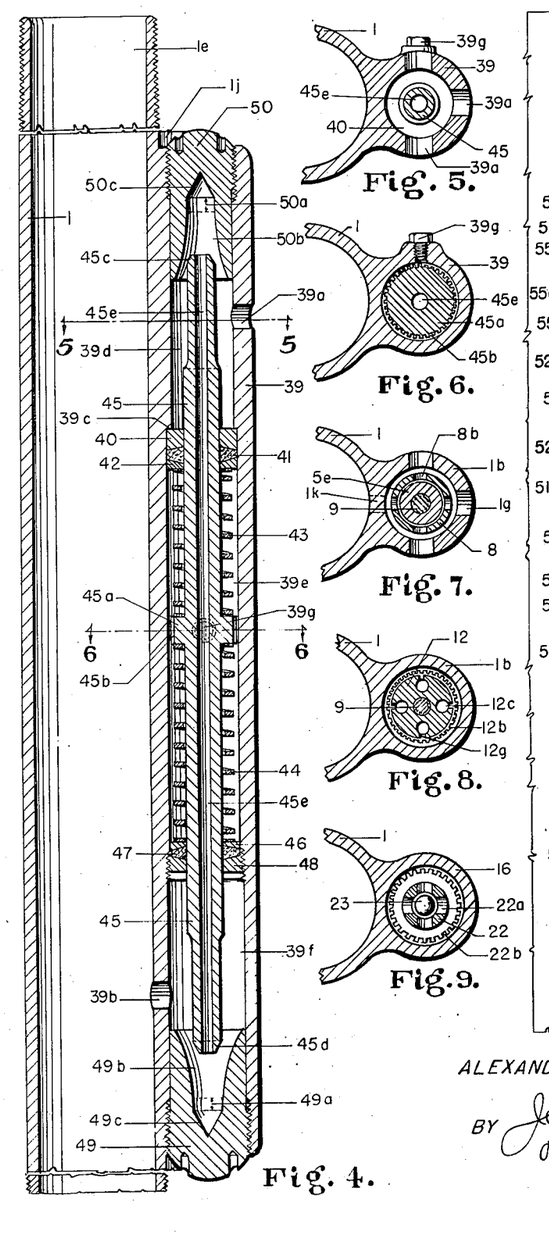
Fig. 4 is a longitudinal section through a further modified form of the invention adapted for either tubing or casing flow.
Fig. 5 is a cross section on the line 5—5, Fig. 4.
Fig. 6 is a cross section on the line 6—6, Fig. 4.
Fig. 7 is a cross section on the line 7—7, Fig. 2.
Fig. 8 is a cross section on the line 8—8, Fig. 2.
Fig. 9 is a cross section on the line 9—9, Fig. 3.

In Fig. 4, adapted for casing and tubing flow and illustrating the second modified form of the invention, the lateral shell 39, like each of the other similar shells, may be cast integrally with the shell 1. This shell has a central opening consisting of the chambers 39d, 39e, and 39f. The chamber 39d is hermetically closed at its upper end by the plug 50, having within it the flared metering chamber 50b and the untapered portion 50a adapted to receive the upper end of the tube 45 with a slide valve fit.

The chamber 39f has its lower end hermetically closed by the plug 49, having within it the flared metering chamber 49b and the untapered portion 49a adapted to receive the lower end of the tube 45 with a slide valve fit.

The ring 40 may be pressed into the chamber 39d and landed upon the internal annular shoulder 39c. The packing 41 is engaged between the ring 40 and the gland ring 42, and urged against the tube 45 by the force of the coiled spring 43 installed under some compression between the ring 42 and the annular enlargement 45a of the tube 45.

The coiled spring 44, similar to the spring 43, is engaged between the external enlargement 45a and the gland ring 46 engaged upon the packing 47 supported by the base ring 48 having threaded engagement within the lower extremity of the chamber 39e. The packing 47 is urged into contact with the tube 45 in similar manner to the corresponding packing 41. The springs 43 and 44 have slight clearance over the tube 45 and large clearance with the shell 39, and the rings 42 and 46 each has slight clearance with the wall of the chamber 39e. The enlargement 45a, having the small longitudinal peripheral slots 45b, is slidable within the chamber 39e. The tube 45 is slidable through the rings 40, 42, 46, and 48, and the packings 41 and 47.

The valves 45c and 45d are resiliently supported slightly within their respective metering chambers 50b and 49b and equidistant from their respective seats 50c and 49c by the balanced force of the springs 43 and 44.

To flow the well through the tubing, the path of the pressure fluid is out of the annular space between the tubing and the casing via the external lateral opening 39a, the clearance between the upper end of the tube 45 within the metering chamber 50b, the central passage 45e, the clearance between the lower end of the tube 45 within the metering chamber 49b and the internal lateral opening 39b. In flowing the well through the tubing, the valve 45d will engage the seat 49c at a pre-determined differential force required to compress the spring 44. In flowing the well through the annular space between the tubing and the casing, the pressure fluid takes the same path, in reverse direction to that stated for tubing flow. In flowing through the casing, the valve 45c will engage the seat 50c at a pre-determined differential force required to compress the spring 43.

The chamber 39e may be filled with a viscous liquid such as castor oil or ground lead and oil which will be confined therein by the packings 41 and 47. The plug 39g Fig. 6, provides for filling or draining this chamber. As the tube 45 is urged in either direction by the differential force, the liquid within the chamber 39e will be forced through the small peripheral slots 45b, thus retarding the seating and unseating movements of the valves 45c and 45d.

If a falling slug of well liquid or other cause should produce a temporary near equality of pressures within and without the tubing, less than that truly obtaining, the valve then closed by the differential, regardless of the direction of liquid flow, will be retarded from quickly opening in response to such false differentials by the resistance of the enlargement 45a acting upon the liquid within the chamber 39e.

Figure 10:
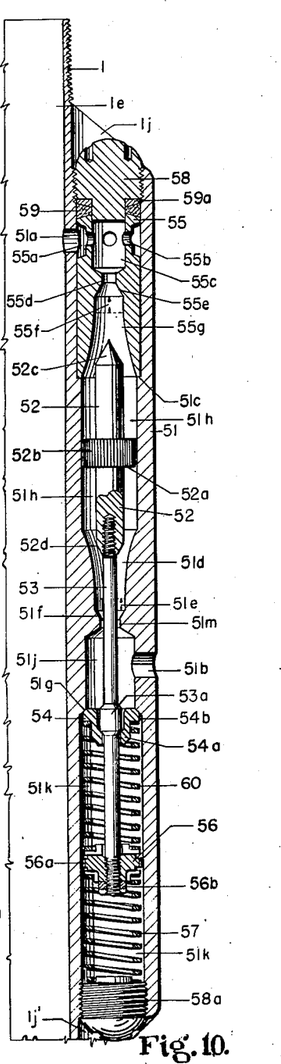
Fig. 10 is a longitudinal section showing another modification of the invention adapted for either tubing or casing flow.

In Fig. 10, illustrating a device adapted to flow the well through either the tubing or the casing, I show a further modified form of this invention wherein the lateral shell 51 has a central bore of varying diameters. The upper end of this bore is hermetically closed by the plug 58 engaged upon the gland ring 59a which in turn engages the packing 59 between the gland ring and the upper end of the valve seat member 55, having its lower end engaged upon the small internal annular shoulder 51c.

The member 55, having a close fit within the chamber 51h, has the downwardly flared metering chamber 55g formed centrally of its lower portion. The untapered portion 55f, having a close slide valve fit with the upper end of the plunger 52, is positioned between the upper end of the flared chamber 55g and the valve seat 55e adapted to be engaged by the valve 52c. The central opening 55d communicates between the metering chamber 55g and the upper chamber 55c out of which the lateral openings 55b lead into the annular recess 55a communicating with the other lateral opening 51a.

The plunger 52 has a central enlargement 52a slidable within the chamber 51h and has the small peripheral slots 52b. The upper end of this plunger is formed into the valve 52c engageable with the seat 55e and the lower end is formed into the valve 52d engageable with the seat 51f. The untapered bore 51e has a close slide valve fit with the lower end of the plunger 52. The upwardly flared metering chamber 51d communicates between this straight bore and the chamber 51h.

The enlargement 52a provides relatively large area to contact the pressure fluid, the valves 52c and 52d being relatively small, and herein resides one of the advantages of this invention.

The rod 53 has threaded connection with the plunger 52 and the piston 56 to which it may be locked by the nut 56b. This rod, having relatively large clearance within the bore 51m, has an enlargement 53a which has its lower end formed into a valve engageable with the seat 54a of the rod rider 54. Relatively large clearance is provided between the enlargement 53a and the central bore within the member 54, the upper portion of this latter member being formed into a valve engageable with the seat 51g and having the clearance 54b within the chamber 51k.

The piston 56, having the small longitudinal peripheral grooves 56a, is slidable within the chamber 51k. Within this chamber, the spring 60 has slight clearance and is installed under some compression, engaged between the members 54 and 56. The plug 58a hermetically closes the lower end of the chamber 51k and supports the spring 57, installed under some compression, and having its upper end engaged under the piston 56. This spring, similar to the other spring 58, likewise has slight clearance within the chamber 51k.

The upper valve 52c and the lower valve 52d are normally positioned equally within their respective metering chambers 55g and 51d and equally distant from their respective seats 55e and 51f by the balanced force of the springs 57 and 60. The force of the spring 60 causes the member 54 yieldably to engage the seat 51g.

The chamber 51k may be filled with a viscous liquid such as castor oil or ground lead and oil which will cause the valves 52c and 52d to seat and unseat slowly by reason of this liquid being forced to move through the small slots 56a as the piston travels in either direction.

When the plunger begins its upward travel, the enlargement 53a will instantly leave its seat 54a and allow fluid from the chamber 51j to enter the chamber 51k via the clearance between the rod enlargement 53a and the member 54 to compensate for the partial withdrawal of the rod 53 from the chamber 51k.

When the plunger moves downward from its normal position shown in Fig. 10, the engagement of the enlargement 53a upon its seat 54a will cause the member 54 to move downward from its seat 51g, thus permitting the displaced liquid within the chamber 51k to escape into the chamber 51j through the clearance 54b. It will be seen in Fig. 10 that the chamber 51j is of sufficient length below the lateral opening 51b to contain such displaced liquid.

Figure 1:
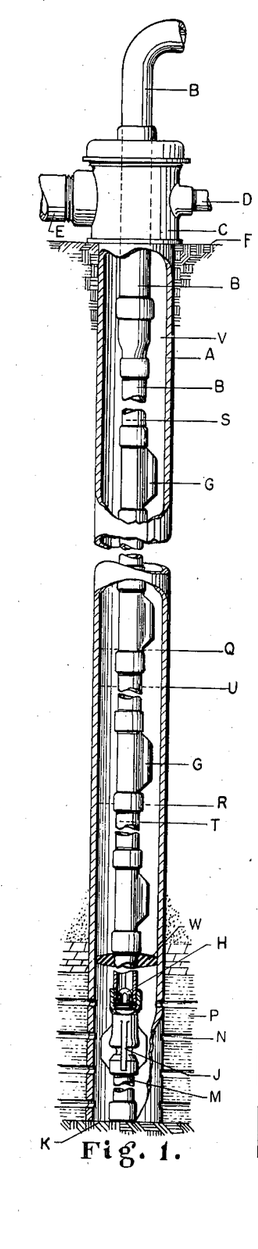
Fig. 1 is an installation diagram of the flow devices spaced at intervals in a well.

To flow the well through the tubing, pressure fluid will pass from the annular space V, Fig. 1, between the tubing and casing and enter the tubing via the lateral opening 51b, Fig. 10, the chamber 51j, the bore 51m, the untapered bore 51e, the metering chamber 51d, the slots 52b, the metering chamber 55g, the straight bore 55f, the opening 55d, the chamber 55c, the lateral openings 55b, the annular recess 55a, and the lateral opening 51a in the order named. For tubing flow, the valve 51c will engage the seat 55e at a predetermined differential force required to compress the spring 60.

To flow the well through the casing, the pressure fluid will take the same path through the device, except in reverse direction from that stated for tubing flow. For casing flow, the valve 52d will engage the seat 51f at a predetermined differential force required to compress the spring 57.

The sliding fit of the enlargement 52a within the chamber 51h and the similar fit of the piston 56 within the chamber 51k causes the valves 52c and 52d to be guided centrally upon their respective seats, as is apparent.

Fig. 11 illustrates that the metering chambers may be varied in their position with relation to the plunger different from the relative position of these parts as shown in Figs. 2, 3, 4, and 10 by placing the metering chambers in apposition coacting with a plunger head and shank of reduced diameter.

In this construction, the members 5, 6, 7, 8, 9, and 10 are the same in form and purpose as shown in Fig. 2 and are shown in Fig. 11 for the purpose of tying in the old construction with the new. The valve tube 64, having the central passage 64c and the shell of reduced diameter 64b, is threadedly joined to the member 5. The plug 62 hermetically closes the upper end of the lateral shell 61 and firmly contacts the upper end of the ring 63, forcing this ring into hermetic engagement with the internal annular shoulder 61a. The downwardly flared metering chamber 62b extends upward, joining the untapered bore 62d having a slide valve fit with the plunger head 64d upon the upper end of which is formed the valve 64a engageable with the seat 62a.

Central of the ring 63, is formed the upwardly flared metering chamber 63a within the lower end of which the plunger head 64d is normally positioned and has slight uniform clearance with it, this clearance being sufficient to produce the necessary pressure differential between the pressures obtaining above and below the pressure fluid valve assembly to initiate upward movement of the assembly.

The untapered shell 62c preferably is of the same length as the straight portion of the plunger head 64d immediately below the valve 64a. The untapered bore 62d may be of the same length as the untapered shell 62c. The metering chambers 62b and 63a preferably should be of equal length.

The construction shown in Fig. 11 is adapted for tubing flow, but may be adapted for casing flow by placing the openings 1g and 1h on opposite sides of the shell 61 from their positions shown in Fig. 11.

For tubing flow, the pressure fluid will take path from the annular space between the tubing and the casing into the tubing via the lateral opening 1g, the cross bores 5c, the central openings 5b and 64c, the variable clearance between the plunger head 64d and the metering chambers 62b and 63a and the lateral opening 1h, in the order named. For tubing flow, the pressure fluid will cause the valve 64a to engage the seat 62a at a predetermined differential force required to compress the spring 11. If the device be adapted for casing flow, as explained, the pressure fluid will flow from the tubing into the annular space between the casing and the tubing through the same path, except that the openings 1g and 1h will be on opposite sides of the shell 61, as above stated. Such change from tubing flow to casing flow does not change the spring and valve action.

The devices illustrated in Figs. 2, 3, 4, 10, and 11, each having the guide slopes 1j and 1j', may be installed in a well as appears in Fig. 1, wherein the casing A is hermetically closed proximately above the ground surface F by the casing head C, having connected into it the pressure fluid pipe line D and the casing flow line E. The tubing B, having a leakproof connection through the casing head, has connected into it the flow devices G spaced at proper intervals, such as 200 to 300 feet. The check valve H may be placed in the tubing proximately above the intake nipple J if the well is to be flowed through the tubing. The check valve H will be omitted if the well is to be flowed through the casing.

The anchor string M may be connected to the intake nipple J and extend to the bottom of the well K in order to support part of the weight of the tubing. The gun perforations N communicate between the producing formation P and the interior of the casing.

To flow the well through the tubing, the discharge line E will be closed and pressure fluid admitted into the annular space V via the pipe line D. The normal liquid level, assumed to be at Q, will quickly change to the depressed level R in the casing and the upstanding level S in the tubing. One or more of the devices G, next above the level R, will discharge pressure fluid into the upstanding column in the tubing and cause the well to flow through the tubing B in a manner well known to the art.

It will be understood that a packer indicated at W, Fig. 1, may be employed if it is desired to prevent externally supplied pressure fluid from contacting the producing formation P.

To flow the well through the casing, by employing the devices illustrated in Figs. 4 and 10, the pipeline D will be closed and the line E opened, the check valve H being omitted. Pressure fluid will then be admitted into the tubing B. The normal liquid level Q will quickly change to the depressed level T in the tubing and the upstanding liquid level U in the casing. One or more devices G, nearest to the base of the upstanding column, will then discharge pressure fluid into it and produce flow through the casing in a manner also well known to the art.

The power graph illustrating the application of pressure fluid force to the liquid load to be lifted will be now briefly discussed. In this connection, it should be observed that the devices should be spaced at such distances apart that the per square inch force exerted by the weight of the unaerated well liquid between adjacent devices will be approximately one-half the differential required to close the pressure fluid inlet valve, i. e. if one hundred feet of the unaerated well liquid exerts 35 pounds per square inch of pressure and it is desired to space them 200 feet apart, the devices should be adjusted to close their inlet valves at approximately 70 pounds.

Pursuant to the preceding statement, the power graph diagrammatically shown in Fig. 12 will be employed to illustrate the application of pressure fluid to the well liquid in the upstanding column. This power graph is applicable to the constructions illustrated in Figs. 2, 3, 10, and 11. The power graph shown in Fig. 13 is applicable to the construction shown in Fig. 4.

In Fig. 12 it will be understood that the distance 65—67 represents the differential between the open and closed positions of the pressure fluid valve. The distance 66—66' represents the maximum volume of pressure fluid passing through any device.

The point of zero differential is indicated at 67, this being at the top of the depressed liquid level, coinciding with the base of the upstanding column. At that level the upstanding column is in balance with the pressure fluid force.

Devices illustrated in Figs. 2, 3, 10, or 11 will be assumed to be positioned in the tubing at uniform distances indicated at 65, 66, and 67. This spacing results in both legs of the obtuse angle with its apex at 66' being of equal length. The device at 66 will be discharging its maximum volume of pressure fluid into the unstanding column. The device at 65 will be in the act of closing its pressure fluid valve, while the device 67 will be in the act of opening its pressure fluid valve.

It will be observed that as the well liquid lowers, the power graph will follow downward as indicated by the triangle 68—69—70, always having its lower extremity resting, so to speak, upon the top of the depressed liquid. As this downward movement progresses to the level indicated by the graph 68—69—70, it will be observed that the volume 66—66a, plus the volume 67—67' is equal to the volume 66—66', and so on until the valve at 66 will close later as the depressed liquid is lowered further. The valve at 67 will be then in the same position with reference to the lowered power graph as the valve at 66 was in the upper position of the graph. It will be thus observed that the power graph in Fig. 12 will discharge an even flow of pressure fluid into the upstanding column in all positional relations of the devices with the varying liquid levels.

The power graph in Fig. 12 will result from the constructions shown in Figs. 2, 3, 10, and 11, because in each of said figures the flow of pressure fluid is controlled by one member having diminishing clearance within a metering chamber, while another member has increasing clearance within another metering chamber.

In Fig. 2, the member 5e has increasing clearance within the metering chamber 8a as the valve 4a approaches its seat, while, at the same time, the upper end of the valve member 4 has diminishing clearance within the metering chamber 2b; the place of greatest pressure fluid flow through the device, therefore, is at the half-way point of the valve travel. Such control of the pressure fluid flow results in the power picture shown by the graph in Fig. 12.

In Fig. 3, as the pressure fluid valve 18a approaches its seat 16b, the head 18b has increasing clearance within the metering chamber 17b, while the valve 18a has diminishing clearance within the metering chamber 16d. This construction also results in a pressure fluid flow as depicted by the power graph in Fig. 12.

In Fig. 10, the lower end of the plunger 52 has increasing clearance at one end within a metering chamber and decreasing clearance at the other end within another metering chamber. This construction also results in a pressure fluid flow as depicted by the power graph in Fig. 12.

In Fig. 11, the plunger head 64d has increasing clearance within the metering chamber 63a as the valve 64a approaches its seat 62a during the first half of its travel. During the last half of the valve travel, the plunger head has diminishing clearance within the metering chamber 62b. This construction, likewise, provides for a power graph as shown in Fig. 12.

It is apparent that either metering chamber may be lengthened or shortened with relation to the other metering chamber in apposition, and that such changes in length of the metering chambers correspondingly will move the peak volume upward or downward on the power graph.

The power graph illustrated in Fig. 13, applicable to the construction shown in Fig. 4, will cause a well to flow with a heading effect as compared to the uniform flow resulting from the application of power, as illustrated in Fig. 12.

The devices at 71, 72 and 73 are spaced uniformly in the tubing, as in Fig. 12. The pressure fluid valve at 72 is intaking pressure fluid at a rate indicated by the distance 72—74. The valve at 71 is just closed and the valve at 73 is just opening. As the depressed liquid level lowers to the position of the power graph 75—76—77, the volume of pressure fluid passing through the device at 72 will increase from the volume 72—74 to the volume 72—77, and the volume of pressure fluid passing through the device at 73 will increase from nothing in the upper position of the graph to 73—78 in the lower position of the graph. It will be observed, therefore, that the power flow is not uniform and steady in Fig. 13 as in Fig. 12.

In Fig. 4, there is shown only one metering chamber for each pressure fluid valve. These chambers 49b and 50b act to reduce the volume of pressure fluid as the valves approach their respective seats (depending upon whether the well is flowed through the tubing or the casing). This results in only the upper or higher differential end of the power graph being controlled by a metering chamber which accounts for the form of the power graph in Fig. 13.

Long experience in building flowing devices of many types has demonstrated that the power graph such as that just described is basic and affords an accurate picture of how a well will flow by use of such equipment.

The value of the pressure fluid employed to flow the well, preferably, should be at least three times the differential required to close the pressure fluid valve, and may be of any greater force.

The differential at which the pressure fluid valves close should be somewhat greater than the per square inch force exerted at the base of a column of well liquid twice as high as the distance the valves are spaced apart in the tubing. Such a valve closing differential provides that each valve, in its turn, will remain open until the next lower valve is uncovered by the receding well liquid.

Figures 16, 17:
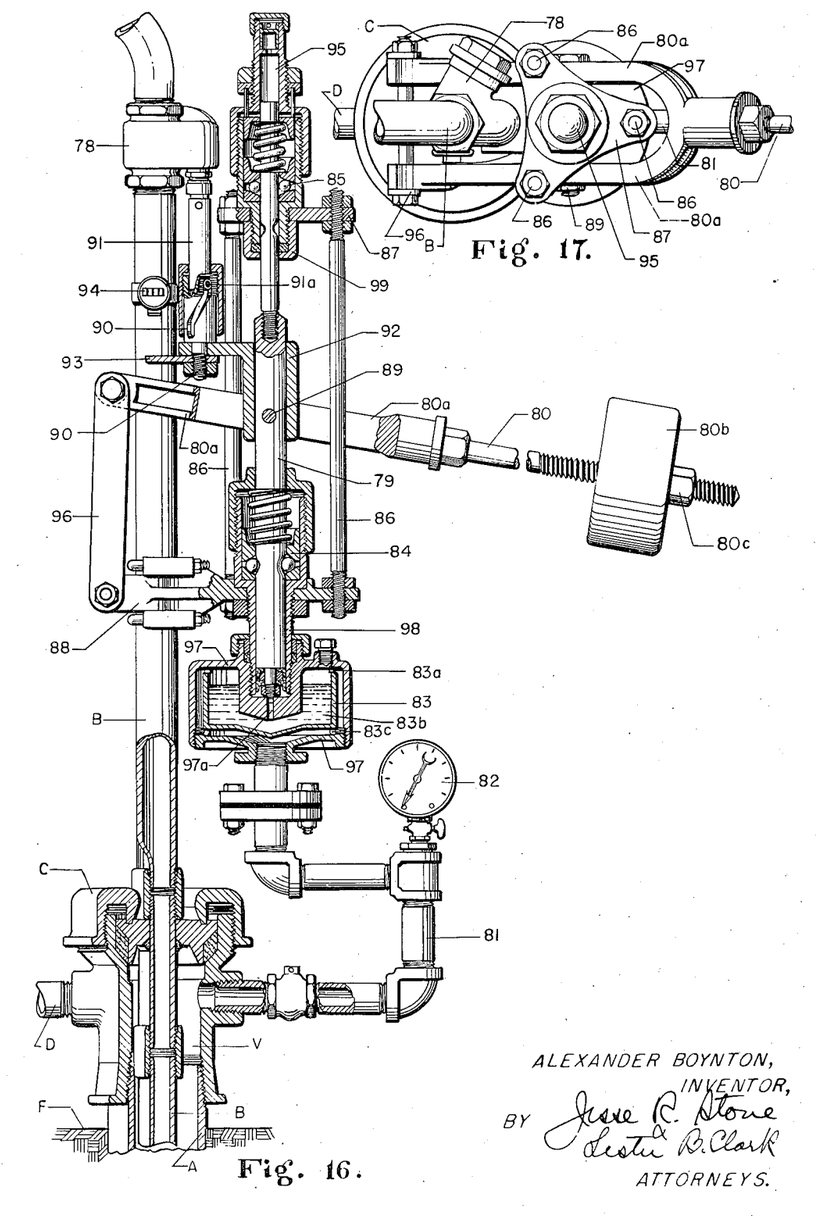
Fig. 16, partially in vertical section and partially in outside view, is an installation plan of a surface intermitter.
Fig. 17 is a top view of the surface intermitter.

Fig. 16 illustrates that an intermitter, such as is more fully described in my co-pending application, Serial No. 242,773, filed November 28, 1938, may be employed in connection with the flow devices herein disclosed.

The valve 78 in the tubing B is operable by the ends of the pin 91a carried by the actuator rod 91. The shell 90, having spiral slots within which the ends of the pin 91a are slidable, is secured upon the arm of the base 92 in such manner as to cause the valve 78 to be opened by the upward movement of the weight carrier 80 and to be closed by its downward movement.

The rods 86 are employed to form and support the assembly of the piston 79 and its associated parts. These rods connecting the plate 87 with the base clamp 88 are adapted to adjust the spacing of these members so as to afford proper travel for the shell 90. The locking cap 99 is employed to secure together the latch assembly 85 and the plate 87.

The bolt 89 which passes with slight clearance through the actuator base 92, the piston 79, and the forks 80a of the weight carrier 80, supports this carrier in such relation with the rocker arms 96 engaged between the clamp 88 and the forks 80a that the piston 79 will control the movement of the weight 80b and the opening and closing of the valve 78.

The casing head C, having an air-tight connection with the casing A and the tubing B, has an outwardly extending boss connected with the tubular line 81 which transmits pressure fluid force from the annular space V to the nether end of the piston 79 via the openings 83c, the clearance between the lubricant cup 83 and the shell 97, the slots 83a and the opening 97a. When this force reaches a pre-determined value, the piston 79 will be forced upward, springing the lower latch 84, and when the pressure fluid force becomes dissipated during the flowing operation to a pre-determined value, the weight 80b will spring the upper latch 85 and return all movable parts to the position shown in Fig. 16.

The lubricant 83b is urged by the pressure fluid to follow the piston and to lubricate its cylinder 98.

The dashpot assembly 95, which may be partially filled with a liquid, will cushion the upstroke of the piston, and the small opening 97a will cause the piston to be cushioned on its downward stroke upon the lubricant 83b.

The mechanical counter 94 is operated by the finger 93 secured upon the arm of the base 92. The weight 80b, secured in any position by the nut 80c, may be employed to regulate the force required to operate the piston 79, this force being registered by the pressure gauge 82.

The invention as herein illustrated and described is manifestly subject to many changes in construction and arrangement of parts which will remain within the scope and purpose of the stated objects and appended claims.

What is claimed is:

1. In a stage lift flowing device the combination of, a valve housing, a valve chamber in said housing, said chamber having an inlet and an outlet leading to the interior and exterior of the valve housing, opposed metering chambers in said valve chamber, each of said metering chambers comprising an inwardly tapering bore having an annular seat at the inner end thereof, and a valve assembly movable in the valve chamber, said valve assembly including opposed valve members having an enlargement therebetween, said enlargement having peripheral slots to pass fluid thereabout, said valve members extending into the metering chambers and simultaneously entering into and withdrawing from their respective metering chambers to admit pressure fluid through the valve chamber as the valve assembly moves from variations in the pressure differential between the interior and exterior of the valve housing.

2. In a stage lift flowing device, a valve housing having a chamber therein, said chamber having an inlet and an outlet forming a passage through the chamber between the interior and exterior of the valve housing, opposed metering chambers in the valve chamber, a valve assembly movable within the valve chamber and including valve ends movable within the metering chambers to meter a pressure fluid flowing between said passages, a second chamber in alinement with the valve chamber, a piston within said second chamber connected to the valve assembly, a liquid filling the chamber about the piston, and means resiliently urging the piston to a position to effect closure of the inlet to the valve chamber.

3. In a stage lift flowing device, a valve housing having a chamber therein, said chamber having an inlet and an outlet forming a passage through the chamber between the interior and exterior of the valve housing, opposed metering chambers in the valve chamber, a valve assembly movable within the valve chamber and including oppositely extending valve members movable within the metering chambers to meter a pressure fluid flowing between said passages, a second chamber in alinement with the valve chamber, a piston within said second chamber connected to the valve assembly, a liquid filling the chamber about the piston, means resiliently urging the piston to a position to effect closure of the inlet to the valve chamber, and a check valve in the piston operable to freely pass liquid therethrough as the valve assembly is moved from the normally closed position.

4. In a stage lift flowing device, a valve housing having a chamber therein, said chamber having an inlet and an outlet forming a passage through the chamber between the interior and exterior of the valve housing, opposed metering chambers in the valve chamber, a valve assembly movable within the valve chamber and including outwardly extending valve members movable within the metering chambers to meter a pressure fluid flowing between said passage, a second chamber in alinement with the valve chamber, a piston within said second chamber connected to the valve assembly, a liquid filling the chamber about the piston, means resiliently urging the piston to a position to effect closure of the inlet to the valve chamber, and a check valve in the piston operable to freely pass liquid therethrough as the valve assembly is moved from the normally closed position, said piston having peripheral slots for restricted flow of the liquid as the valve assembly is moved toward normally closed position.

ALEXANDER BOYNTON.